United States Patent [19]

Howard

[11] Patent Number: 4,596,383
[45] Date of Patent: Jun. 24, 1986

[54] GAS SPRING WITH SECONDARY LOCK

[75] Inventor: Timothy L. Howard, Ambler, Pa.

[73] Assignee: Gas Spring Company, Division of Fichtel & Sachs Industries, Inc., Colmar, Pa.

[21] Appl. No.: 582,063

[22] Filed: Feb. 21, 1984

[51] Int. Cl.⁴ ............................................. F16F 9/32
[52] U.S. Cl. ................................... 267/64.12; 16/84; 188/300; 267/120
[58] Field of Search ................... 267/64.12, 118, 120, 267/71; 188/300, 321.11, 322.12, 265; 16/DIG. 1, DIG. 9, DIG. 10, 66, 84; 296/56, 65 A, 76; 292/278, 338

[56] References Cited

U.S. PATENT DOCUMENTS

| | | | |
|---|---|---|---|
| 3,883,126 | 5/1975 | Nicholls | 267/65 R |
| 4,078,779 | 3/1978 | Molders | 267/120 |
| 4,235,317 | 11/1980 | Maciejewski | 188/322.11 X |
| 4,240,619 | 12/1980 | Wirges et al. | 267/120 X |
| 4,385,754 | 5/1983 | Waite | 267/71 |
| 4,449,702 | 5/1984 | Hasegawa | 267/64.12 |

FOREIGN PATENT DOCUMENTS

| | | | |
|---|---|---|---|
| 0818730 | 9/1951 | Fed. Rep. of Germany | 267/71 |
| DE2951093 | 7/1981 | Fed. Rep. of Germany | |
| 0014636 | 12/1981 | Japan | 267/64.12 |
| 2065827 | 7/1981 | United Kingdom | 267/120 |
| 2087509 | 5/1982 | United Kingdom | 267/71 |
| 2113798 | 8/1983 | United Kingdom | 267/120 |

Primary Examiner—Bruce H. Stoner, Jr.
Assistant Examiner—Michael P. Gilday
Attorney, Agent, or Firm—Brumbaugh, Graves, Donohue & Raymond

[57] ABSTRACT

A mechanical locking device for restraining the piston rod of a gas spring in an extended position comprises a lock tube mounted on the piston rod coaxially with the cylinder and adapted to ride telescopingly over the cylinder during normal inward and outward movement of the piston rod. Apparatus is provided on the piston rod whereby the piston rod can be overextended, beyond its normal fully extended position, to permit the lock tube to move out of coaxial alignment with the cylinder; the end of the lock tube thereby abuts the end face of the cylinder and prevents inward movement of the piston rod.

4 Claims, 4 Drawing Figures

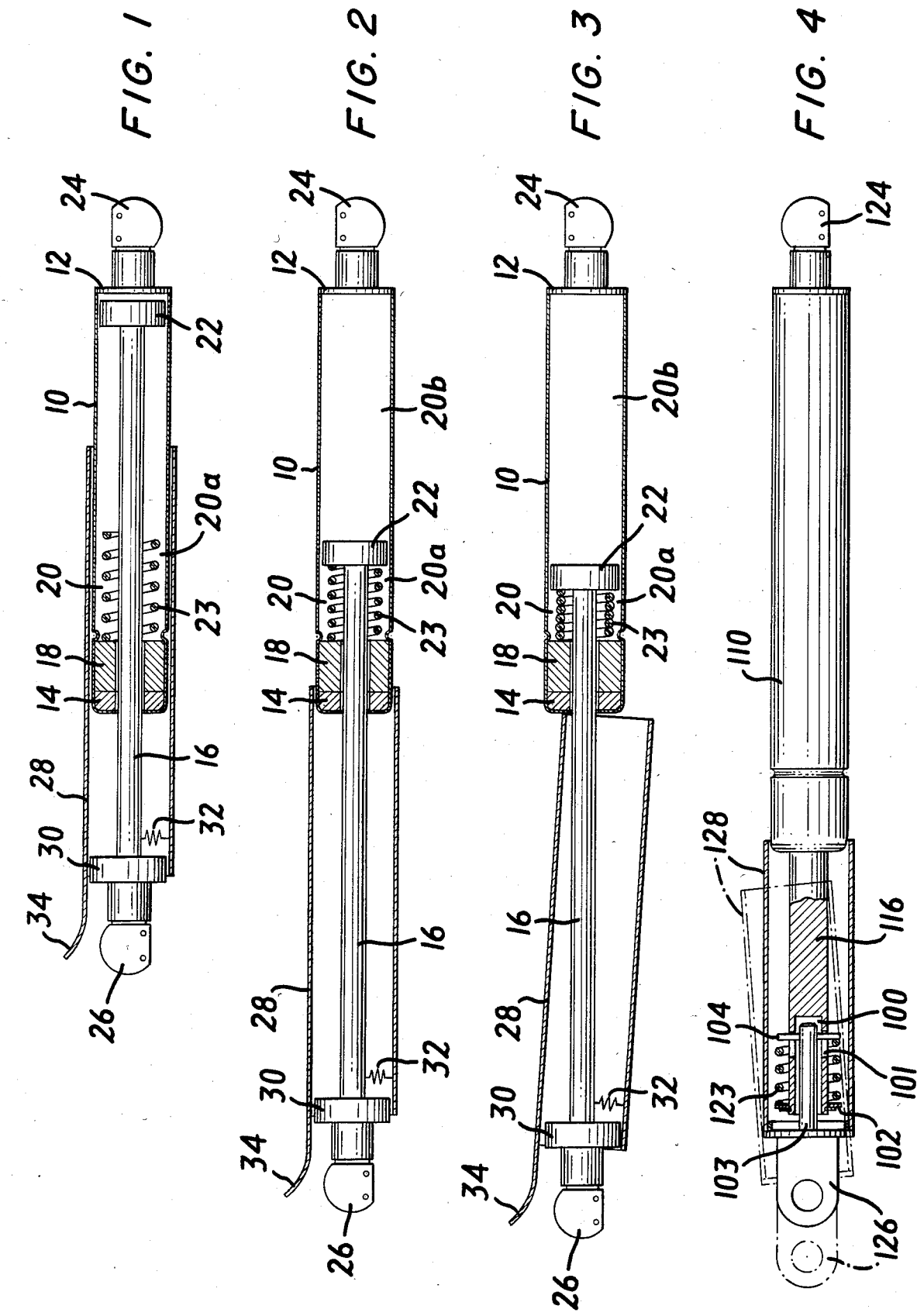

GAS SPRING WITH SECONDARY LOCK

BACKGROUND OF THE INVENTION

1. Field of the Invention

The invention relates to gas springs, and in particular to gas springs having external locking means for retaining a piston rod in an extended position relative to a cylinder.

2. The Prior Art

Gas springs of this general type are useful, for example, in pivoting a trunk lid or hatch-back of an automobile between open and closed positions. When the trunk lid is raised and the gas spring is fully extended, it may be desirable, or necessary in the event of a gas leakage, to engage the mechanical lock to retain the lid in the fully open position.

An example of a gas spring with a locking device for locking the piston rod in its fully extended position is described in U.S. Pat. No. 4,078,779. The pneumatic spring according to this patent comprises a spring arm mounted on the outward end of a piston rod. The spring arm has apertures in it into which a pin provided on the cylinder locks when the piston rod is extended. To permit inward movement of the piston rod, the spring arm is pulled away from the cylinder, thereby disengaging the pin from the spring arm aperture in which it has been engaged.

U.S. Pat. No. 3,883,126 discloses a gas spring having a shield tube mounted on the piston rod, and a latch device comprising diametrically opposed spring arms provided on the apertured end of the cylinder. As the piston rod is extended, the shield tube rides telescopingly over the cylinder until the piston rod is fully extended and the shield tube is clear of the spring arms, at which point the spring arms move outwardly and form a surface against which the shield tube abuts, thereby preventing inward movement of the piston rod. To permit inward movement of the piston rod, the spring arms are manually compressed toward each other so that the shield tube again is able to ride telescopingly over the spring arms.

It is a disadvantage of these known gas springs that, even when unnecessary or undesirable, the external latching devices of these gas springs operate to restrain the piston rod in its extended position, unless and until they are disengaged, every time the gas spring is fully extended in its normal operation.

Thus, an object of the present invention is to provide a gas spring with an external locking mechanism that is not engaged during normal operation between its normal inward and outward positions, but only when specifically desired by its operator. For example, in the event of a gas leak rendering the gas spring inoperative, or rendering the gas spring unable to counterbalance the weight of a hood or trunk lid to maintain it in the open position, the consumer may use the present invention to retain the piston rod in an extended position.

SUMMARY OF THE INVENTION

As will become apparent from the following detailed description of exemplary embodiments, these and other objects of the present invention are attained by providing a mechanical locking device which is operational only if the piston rod is extended beyond its normal fully extended position into an "override" or overextended position.

In accordance with a first embodiment, a cylindrical lock tube is mounted on the piston rod so as to be coaxial with the cylinder and during normal operation of the gas spring, ride telescopingly over the cylinder. A spring is provided on the piston rod between the piston and the guiding and sealing device at the apertured end of the cylinder. Should a consumer wish to engage the locking mechanism, he may do so by exerting an outwardly directed force on the piston rod, whereby the force of the spring is overcome and the piston rod is moved into an overextended position, at which point the lock tube rides over the apertured end of the cylinder and is moved out of coaxial alignment with the cylinder, so that the end of the lock tube abuts the end face of the cylinder. The lock tube may be urged, or biased, out of its coaxial position by a spring arranged between the lock tube and the piston rod. To permit inward movement, an outward force is again applied to free the end of the lock tube from the end face of the cylinder, and the lock tube is coaxially realigned with the cylinder, thereby permitting the lock tube to ride telescopingly over the cylinder as the piston rod moves inwardly of the cylinder.

According to an alternative embodiment, the overextension spring is provided on the piston rod outside of the cylinder cavity and is housed within the lock tube. The end fitting on the end of the gas spring comprises a rod having a pin on its inward end. The rod and pin are inserted into a bore and elongated slot provided on the outward end of the piston rod. To engage the locking mechanism, an outward force is applied to the gas spring so that the end fitting with its associated rod and pin move axially outwardly, the rod and pin sliding in the piston rod bore and elongated slot, respectively, against the force of the overextension spring. The lock tube is then able to move out of axial alignment with the cylinder to abut the end face of the cylinder in a manner similar to the first embodiment described above.

BRIEF DESCRIPTION OF THE DRAWINGS

For a better understanding of the present invention, the scope of which will be pointed out in the appended claims, reference is made to the following detailed description of two exemplary embodiments thereof, taken in conjunction with the accompanying drawings, in which:

FIG. 1 is a cross-sectional view of a gas spring constructed in accordance with a first embodiment of the present invention, illustrating the gas spring in a compressed position;

FIG. 2 is a cross-sectional view of the gas spring of FIG. 1 in its normal fully extended position;

FIG. 3 is a cross-sectional view of the gas spring of FIG. 1 in its "override" extended position, showing the locking mechanism in accordance with a first embodiment of the present invention in its operative configuration; and FIG. 4 is a cross-sectional view of a gas spring in accordance with a second, alternative embodiment of the invention, with the locking mechanism illustrated in its "override" extended position analogous to the illustration of FIG. 3.

DETAILED DESCRIPTION OF THE DRAWINGS

With reference first to FIGS. 1–3, there is shown a gas spring comprising a cylinder 10 having an imperforate end wall 12 and an annular end wall 14 from which a piston rod 16 projects. A guiding and sealing member 18 at the annular end 14 of the cylinder 10 prevents the escape of compressed gas from a cavity 20 formed within the cylinder 10. A piston 22 carried on the piston rod 16 separates the cavity 20 into two working chambers 20a and 20b on axially opposite sides of the piston 22. The piston may conventionally include fluid passages and valve means, which are not essential to an understanding of the present invention and, therefore, not illustrated, for permitting fluid flow between the working chambers 20a and 20b as the piston rod 16 moves axially inward and outward of the cylinder 10. A spring 23 is provided on the piston rod 16 between the piston 22 and the annular end 14 of the cylinder 10 for a purpose to be described more fully below. The cylinder 10 and piston rod 16 are each provided with suitable end fittings 24, 26, respectively, for mounting the gas spring to the objects to which it is to be connected, for example, an automobile body and a trunk lid, respectively.

A cylindrical lock tube 28 is mounted on the piston rod 16 by, for example, a collar 30. The lock tube 28 has an interior diameter which is slightly greater than the exterior diameter of the cylinder 10, and is thus able to ride telescopingly over the cylinder 10 during the normal inward and outward movement of the piston rod 16. The length of the lock tube 28 is such that when the piston rod 16 is in its normal fully extended position, as illustrated in FIG. 2, the lock tube 28 remains coaxial with and telescopingly over an end portion of the cylinder 10 adjacent the annular end 14 thereof.

A spring 32 is housed within the lock tube 28 and is provided between the piston rod 16 and the lock tube 28 near the outer end of the piston rod 16. If for some reason a consumer wanted to engage the locking device, as, for example, if a gas leak has rendered the counterbalancing ability of the gas spring ineffective, or as an added precaution, he may do so by exerting an outward force on the piston rod 16 so as to overextend it outward of the cylinder 10 beyond its normal fully extended position, overcoming the action of the spring 23 provided on the piston rod 16, until the lock tube 28 rides over the end of the cylinder 10. The spring 32 between the lock tube 28 and the piston rod 16 thus urges the lock tube 28 out of its position coaxial with the cylinder 10 as seen in FIG. 3. The end of the lock tube 28 thus abuts the end face of the cylinder 10, thereby locking the piston rod 16 out of the cylinder 10.

To permit axially inward movement of the piston rod 16, the consumer need only urge the piston rod slightly outward and axially realign the lock tube 28 and the cylinder 10 (which may be done, for example, by manipulating a lever 34 which may be provided on the outward end of the lock tube 28), thus permitting the lock tube 28 again to ride telescopingly over the cylinder 10 as the piston rod 16 moves axially inward of the cylinder 10.

In the alternative embodiment illustrated in FIG. 4, rather than providing the override spring mechanism within the cylinder (such as the spring 23 in the FIG. 1 embodiment), the override spring mechanism is located on the piston rod outside of the cylinder cavity, and is housed within the lock tube 128. The piston rod 116 has an axial bore 100 in its outward end, and an elongated slot 101 extending from the axially inner end of the bore 100 a slight distance toward the outer end of the piston rod 116. The end fitting 126 for mounting the spring to, for example, a trunk lid, is coupled to the piston rod 116 by a rod 103 and a pin 104 which are inserted into and axially movable within the piston rod bore 100 and the elongated slot 101, respectively, and held on the piston rod 116 by a snap ring 102. The end fitting 126 is urged against the piston rod 116 by the action of the spring 123, which urges the rod 103 and the pin 104 inwardly of the piston rod bore 100 and slot 101.

If a consumer wishes to engage the locking device according to this embodiment, the piston rod is urged into an overextended position by, for example, pushing the trunk lid or hood upwardly so that the end fitting 126 is moved outwardly against the force of the spring 123 away from the piston rod 116; i.e., the rod 103 and the pin 104 slide outwardly in the bore 100 and the elongated slot 101, respectively. The lock tube 128 can then be moved out of coaxial alignment relative to the cylinder 110 (as shown in phantom in FIG. 4) so that its end abuts the end face of the cylinder in a manner similar to that illustrated in FIG. 3.

Although not illustrated in FIG. 4, this alternative embodiment may include a spring, similar to the spring 32 of the FIG. 1 embodiment, to urge the lock tube 128 out of coaxial alignment, as well as a lever similar to the lever 34 of the FIG. 1 embodiment to aid in realigning the lock tube 128 with the cylinder 110.

While the invention has been described by way of two exemplary embodiments, it will be appreciated by those skilled in the art that variations and modifications may be made thereto without departing from the spirit of the inventive concepts disclosed herein. All such variations and modifications are intended to fall within the scope of the appended claims.

I claim:

1. In a gas spring comprising:
   (a) a cylinder member having an axis and first and second ends defining a cavity therein;
   (b) a piston rod member extending into said cavity through said first end and being axially movable with respect to said cylinder member between an axially inward position and a normal extended outward position;
   (c) first and second end fitting means on said piston rod member and said second cylinder end, respectively;
   (d) a piston unit mounted on said piston rod member in said cavity for movement with said piston rod, and separating said cavity into a first compartment adjacent said first end and a second compartment adjacent said second end, said first and said second compartments being hermetically closed at said first and second cylinder ends;
   (e) a body of fluid under a pressure higher than atmospheric pressure sealed in said cavity for biasing said piston rod member axially towards said first end of said cylinder member;
   (f) a lock tube having an axis and being mounted on said piston rod member so as to be coaxially aligned with said cylinder member axis and adapted to ride telescopingly over said cylinder member during axial movement of said piston rod member, the improvement wherein:
   an overextension spring means is provided on said piston rod and housed within one of said cylinder member and said lock tube for resiliently holding said piston rod at said normal extended outward position against the force exerted thereon by said pressurized fluid, said piston rod being extendable beyond said normal extended outward position against the force of said overextension spring means to an overextended position, said lock tube member being displaceable out of coaxial alignment with said cylinder when in said overextended position and into a position wherein an end of said lock tube abuts said first end of said cylinder member, thereby preventing inward movement of said piston rod, said spring means resiliently biasing said end of the lock tube into abutment with said first end of said cylinder member.

2. The gas spring according to claim 1, wherein said overextension spring means is provided on said piston rod member within said cylinder member and between said piston unit and said first cylinder end.

3. The gas spring according to claim 1, wherein said overextension spring means is provided on said piston rod member outside said cylinder member and within said lock tube.

4. The gas spring according to claim 3, wherein said piston rod member includes an axial bore in its outward end, said axial bore having an elongated slot extending axially along a portion thereof, and wherein said lock tube is connected to said first end fitting means which comprises (1) a rod inserted in and axially movable with respect to said axial bore, (2) a pin mounted on said rod and received in said elongated slot, and (3) a snap ring retaining said overextension spring means on said piston rod member between said snap ring and said pin, whereby an outward force exerted on said first end fitting means sufficient to overcome said overextension spring means causes said rod and pin to move outwardly in said axial bore and elongate slot, respectively, thereby moving said piston rod member into said overextended position in which said lock tube is free to abut said first cylinder end.

* * * * *